United States Patent [19]
McKoy et al.

[11] Patent Number: 5,621,787
[45] Date of Patent: Apr. 15, 1997

[54] PREPAID CASH CARD

[75] Inventors: Reginald V. McKoy, Silver Spring, Md.; Lilly Chin-Aronds, Clark, N.J.; Robert D. Farris, Sterling, Va.

[73] Assignee: Bell Atlantic Network Services, Inc., Arlington, Va.

[21] Appl. No.: 527,595

[22] Filed: Sep. 13, 1995

[51] Int. Cl.$^6$ .......................... H04M 15/00; H04M 17/00; G06K 5/00; G06F 7/08

[52] U.S. Cl. .......................... 379/144; 379/112; 379/113; 379/114; 379/115; 379/121; 235/380; 235/381; 235/382

[58] Field of Search .............................. 379/111, 91, 112, 379/113, 114, 115, 121, 146; 235/380, 381, 382

[56] References Cited

U.S. PATENT DOCUMENTS

| | | |
|---|---|---|
| 4,178,476 | 12/1979 | Frost . |
| 4,191,860 | 3/1980 | Weber . |
| 4,313,035 | 1/1982 | Jordan et al. . |
| 4,562,572 | 12/1985 | Goldman et al. . |
| 4,611,094 | 9/1986 | Asmuth et al. . |
| 4,611,096 | 9/1986 | Asmuth et al. . |
| 4,654,879 | 3/1987 | Goldman et al. . |
| 4,658,416 | 4/1987 | Tanaka . |
| 4,680,785 | 7/1987 | Akiyama et al. . |
| 4,698,839 | 10/1987 | DeVaney et al. . |
| 4,706,275 | 11/1987 | Kamil ........................ 379/144 |
| 4,737,978 | 4/1988 | Burke et al. . |
| 4,748,655 | 5/1988 | Thrower et al. . |
| 4,748,681 | 5/1988 | Schmidt . |
| 4,752,951 | 6/1988 | Konneker . |
| 4,756,020 | 7/1988 | Fodale . |
| 4,757,267 | 7/1988 | Riskin . |
| 4,765,753 | 8/1988 | Schmidt . |
| 4,771,448 | 9/1988 | Koohgoli et al. . |
| 4,775,997 | 10/1988 | West, Jr. et al. . |
| 4,775,999 | 10/1988 | Williams . |
| 4,788,718 | 11/1988 | McNabb et al. . |
| 4,802,220 | 1/1989 | Marker . |
| 4,825,349 | 4/1989 | Marcel . |
| 4,852,148 | 7/1989 | Shibata et al. . |
| 4,866,703 | 9/1989 | Black et al. . |
| 4,878,238 | 10/1989 | Rash et al. . |
| 4,878,243 | 10/1989 | Hashimoto . |
| 4,883,701 | 11/1989 | Comroe . |
| 4,899,373 | 2/1990 | Lee et al. . |
| 4,901,340 | 2/1990 | Parker et al. . |
| 4,903,319 | 2/1990 | Kasai et al. . |
| 4,922,482 | 5/1990 | Tanahashi et al. . |
| 4,932,042 | 6/1990 | Baral et al. . |
| 4,932,049 | 6/1990 | Lee et al. . |
| 4,965,850 | 10/1990 | Schloemer . |
| 4,980,907 | 12/1990 | Raith et al. . |
| 4,989,230 | 1/1991 | Gillig et al. . |
| 4,996,715 | 2/1991 | Marui et al. . |
| 5,014,269 | 5/1991 | Picandet . |
| 5,020,093 | 5/1991 | Pireh . |
| 5,020,094 | 5/1991 | Rash et al. . |
| 5,029,163 | 7/1991 | Chao et al. . |
| 5,040,177 | 8/1991 | Martin et al. . |
| 5,067,147 | 11/1991 | Lee . |
| 5,090,050 | 2/1992 | Heffernan . |
| 5,090,051 | 2/1992 | Muppidi et al. . |
| 5,105,197 | 4/1992 | Clagett . |
| 5,109,400 | 4/1992 | Patsiokas et al. . |
| 5,109,405 | 4/1992 | Morganstein . |
| 5,117,502 | 5/1992 | Onoda et al. . |
| 5,119,482 | 6/1992 | Lloyd . |
| 5,127,042 | 6/1992 | Gillig et al. . |
| 5,127,100 | 6/1992 | D'Amico et al. . |
| 5,138,650 | 8/1992 | Stahl ........................ 379/91 |
| 5,142,654 | 8/1992 | Sonberg et al. . |
| 5,144,649 | 9/1992 | Zicker et al. . |
| 5,153,907 | 10/1992 | Pugh et al. . |
| 5,157,709 | 10/1992 | Ohteru . |
| 5,179,721 | 1/1993 | Comroe et al. . |
| 5,197,092 | 3/1993 | Bamburak . |
| 5,200,957 | 4/1993 | Dahlin . |
| 5,210,785 | 5/1993 | Sato et al. . |
| 5,210,786 | 5/1993 | Itoh . |
| 5,210,787 | 5/1993 | Hayes et al. . |
| 5,216,703 | 6/1993 | Roy . |
| 5,237,612 | 8/1993 | Raith . |
| 5,251,248 | 10/1993 | Tokunaga et al. . |
| 5,259,018 | 11/1993 | Grimmet et al. . |
| 5,260,987 | 11/1993 | Mauger . |
| 5,272,747 | 12/1993 | Meads . |
| 5,276,731 | 1/1994 | Arbel . |
| 5,311,571 | 5/1994 | Pickert . |

| | | |
|---|---|---|
| 5,315,636 | 5/1994 | Patel . |
| 5,319,699 | 6/1994 | Kerihuel . |
| 5,325,419 | 6/1994 | Connolly et al. . |
| 5,327,480 | 7/1994 | Breeden . |
| 5,341,414 | 8/1994 | Popke . |
| 5,353,335 | 10/1994 | D'Urso .................................. 379/144 |
| 5,438,615 | 8/1995 | Moen ..................................... 379/111 |
| 5,452,350 | 9/1995 | Reynolds . |
| 5,469,497 | 11/1995 | Pierće .................................... 379/115 |
| 5,511,114 | 4/1996 | Stimson ................................. 379/114 |

FOREIGN PATENT DOCUMENTS

| | | |
|---|---|---|
| 2009295 | 1/1990 | Japan . |
| 2009294 | 1/1990 | Japan . |
| 2272856 | 11/1990 | Japan . |
| 3019532 | 1/1991 | Japan . |
| 2193861 | 2/1988 | United Kingdom . |

OTHER PUBLICATIONS

"Motorola – An Introduction to the Pan–European Digital Cellular Network", G.S.M. 1990.
M. Ballard et al., "Cellular Mobile Radio as an Intelligent Network Application", Electrical Communication, vol. 63, No. 4 (1989).
"AIN 0.1 Switching Requirements", TR–NW T–001284, BellCore Publication.
"AIN 0.2 CP Adjunct Interface Requirements", TR–NWT 001299, BellCore Publication.
"Calling Party Pays" by Lloyd Covens; Cellular Marketing, vo. 6, N. 6, p. 33(3), Jun. 1991.
"McCaw Offers Calling Party Pays Feature in Boise Trail; Customers Now Have More Affordable Choices", Businesswire, May 27, 1993.
"ISDN Electronic Key Telephone Serive", TR–NW T–000205, BellCore Publication.
"ISDN Access Call Contol Switching and Signaling Requirements", TR–TSY 000268, BellCore Publication.
"Guidelines for ISDN Terminal Equipment on Basic Access Interfaces", SR–NT 001953, BellCore Publication.
"ISDN Layer 3 Protocol Details for Support of Supplementary Services", TR–TSY 000861, BellCore Publication.
"ISDN Hold Capability for Managing Multiple Independent Calls", TR–TSY 000856, BellCore Publication.
"Additional Call Offering for Managing Multiple Independent Calls", TR–TSY 000857 BellCore Publication.
"Flexible Calling for Managing Multiple Independent Calls", TR–TSY 000858, BellCore Publication.
"Bell Communication Research Specification of SS7", TR–NWT 000246, BellCore Publication.
"Call Handling and Cell to Cell Handover", Ericsson, 1990, DCT 900/DECT.
"GSM Radio Interface", Br. Telecom Technical Journal, Jan. 1990, vol. 8, No. 1.
Wites, "Calling Party Pays".
"Convincing Te'cos Seen as Key for Calling Party Pays Mobile Phone News", May 24, 1990.
EMX Electronics Switching Equipment Motorola.
Donogue et al., entitled "The Building of Intelligent Networks – Architecture and Systems for Alcatel", Communications & Transmission, (No. 2–1989), pp. 5–22, published by Sotelec, Paris France.

*Primary Examiner*—Wellington Chin
*Assistant Examiner*—Vijay Shankar
*Attorney, Agent, or Firm*—Lowe, Price, LeBlanc & Becker

[57]     ABSTRACT

A system is provided which uses a pre-purchased card having an identity number to make long distance telephone calls or to order services over a landline telephone system. When long distance telephone calls are being purchased, the agent selling the card has the option of selecting the long distance Interexchange Carriers to be used. The present system also allows the card purchaser to select his or her own long distance carriers. In the alternative, the card ID can be used in the same manner as a credit card if the system has the capacity to carry out the necessary transactions to check the credit worthiness of the user.

49 Claims, 5 Drawing Sheets

PREPAID CASH CARD

TECHNICAL FIELD

The present invention relates to the use of a prepaid cash card to purchase services via telephone. The system encompassing the prepaid cash card would provide for selection of multiple interexchange carriers and a variety of techniques for authenticating the user of the prepaid cash card to purchase services on credit via telephone.

ACRONYMS

The written description uses a large number of acronyms to refer to various services and system components. Although generally known, use of several of these acronyms is not strictly standardized in the art. For purposes of this discussion, acronyms therefore will be defined as follows:
Advanced Intelligent Network (AIN)
Central Office (CO)
Common Channel Inter-office Signalling (CCIS)
Cash Card Network (CCN)
Data and Reporting System (DRS)
Direct-in-Dial (DID)
Direct-out-Dial (DOD)
Integrated Service Control Point (ISCP)
Integrated Services Digital Network (ISDN)
Intelligent Peripheral (IP)
Interexchange Carrier (IXC)
Maintenance and Operations Center (MOC)
Multi-Services Application Platform (MSAP)
Service Control Point (SCP)
Service Creation Environment (SCE)
Service Management System (SMS)
Service Switching Point (SSP)
Signaling Transfer Point (STP)
Simplified Message Desk Interface (SMDI)
Tandem (TDM)
Transaction Capabilities Applications Protocol (TCAP)

BACKGROUND ART

Landline telephones are available in most places. Most telephones are privately owned and thus any telephone calls on a particular line are charged to the telephone subscriber or a monthly or bimonthly basis. Due to accounting complication, it is not always possible or convenient to determine the time and charges for a single telephone call as it is made. Consequently, multiple users on a single phone line can be very awkward.

Also, toll or long distance telephone calls can be very problematic. Long distance calls can be made by charging the call to a local telephone such as for example to a telephone in a hotel room. The long distance call can be made by instant payment such as when using a public payphone. A long distance call can also be made by charging the call to the calling party's home or business telephone or by using a telephone company credit card number. Further, a long distance call can be made as a "collect call" where the called party has to accept the call and is then billed for the time charged for the call.

It is presently known that certain companies (i.e., AT&T, Sprint and others) are offering prepaid cash card calling over their own networks. Generally these services involve allowing access to the provider's network by having the end-user dial an 800 number. A database with account management and real-time-rating capabilities (RATER) tracks the prepaid cash card value and deducts the account as call progression occurs.

The customer acquires a card with a special code, a credit amount and the telephone number of a special central office or "like" facility by either a cash or credit card payment. The code, the credit amount and telephone numbers may be acquired, for example through the regular credit card companies and charged to the acquirer's credit card. Alternatively, the credit amount, the telephone numbers and identifying code can be purchased at sales points such as in airports, hotels, rent-a-car stations and the like. The amount paid is credited to the acquirer for use against future telephone calls. The credited amount is stored in a memory at the special central office or the like, such as a data base or platform, along with the special code.

A party wishing to make a telephone call which may be a local call or a toll call can acquire a prepaid credit amount. He ore, she uses the nearest available telephone, removes the handset and dials a special data base, platform or special central office. When he or she is connected to the data base, platform, special central office or exchange, a special dial tone is sent from the special exchange to the calling station. When the calling party hears the special dial tone, indicating that the computer at the exchange is ready for he or she, he or she dials the identifying code and the called number he or she wants. The computer at the special exchange checks the code and registers the desired called number.

If the code number is a genuine code with credit, a regular dial tone is sent to the calling party station as he or she is connected to the regular telephone system. The computer at the special exchange routes the call on the most economical available lines according to prior arrangements with long distance line suppliers. The calling party's predialed numbers are transmitted. The system can also be arranged so that the calling party dials the called party responsive to receipt of the regular dial tone.

Special exchange equipment such as an intelligent platform can provide an artificial or prerecorded voice announcement stating the amount of credit available and that the amount of credit is equivalent to so many minutes of talking time on the call being connected. The announcement is made according to the charge rate for the distance between calling and called parties.

A credit check can be accomplished contemporaneously with the number code verification. If the code is invalid an announcement is made advising the customer to try again. The customer is allowed a predetermined plurality of tries (for example three) before being disconnected from the special central office. If he or she is trying again for the second and third times he or she is reconnected to receive the special dial tone. After the third time he or she is released from the special exchange after receiving a recorded announcement explaining that the code is not valid.

Conventional systems can operate to allow the calling party to dial while the verification is being accomplished, in which case when the calling party hears normal dial tone, a register in the exchange can then input the dialed information to cause the exchange to complete the call between the calling party and the called party.

A normal time and distance computing circuit such as a peg counter, can be put into service to provide information for timing the call against the available credit. Thus, for example, the information from the peg counter is sent to a comparator to continuously determine whether the calling party's credit is sufficient to pay for the call. When the credit equals the used time rate the call is automatically ended by the computer.

Upon failure to maintain a positive credit level, the connection between the calling and called party opens, the connection to the computer however remains and an announcement is made to notify the customer to insert another code number, if available. If a new code number (with valid credit) is inserted by the customer, then the calling party again receives a dial tone and can dial a new called party. In other words he or she goes back to the input where he or she has computer tone and he or she is told to dial the code number and the calling party number. All the steps are repeated and the new call is connected. If the customer does not have a new code number, then the connection between the computer and the calling party is opened.

The call can also be terminated by the user. When the call is terminated by the user, and he or she still has credit, he or she is again connected to normal dial tone, and he or she merely has to dial another call, if he or she so desires. If he or she does want to dial another call, then he or she returns the handset to the hookswitch. If he or she does want to make another call he or she dials the number after hearing a normal dial tone. Thus, the customer does not have to repeat the entire connection back to the computer and have the validation procedure repeated. He or she had already been checked and validated and therefore he or she is connected to a normal dial tone. The process is repeated as long as positive credit remains.

With a dedicated public telephone, the customer calling party must have a prepaid code number. To begin the operation, he or she goes off hook with the dedicated public telephone. The calling station receives computer dial tones as soon as going off hook. He or she then dials in the secret code number and the system checks to see if he or she has a valid number. If he or she does, he or she is visually or audibly notified of the amount of credit available in his code. If he or she does not have a valid code then he or she is notified that he or she has inserted an invalid code. A recorded message can be sent for this purpose.

If an invalid code is inputted more than a predetermined number of times (three times for example), then the phone is disconnected for a specified time period (for example, five minutes). This disconnection time is implemented to discourage practical jokes, fraud or anybody maliciously trying to tie up the telephone. After the five minute time period, the phone is returned to its normal operating capabilities. A recorded message may be sent to notify potential users that this phone is out of order for diminishing periods of time, i.e., three minutes, four minutes, etc.

After verification of the code number and credit the calling party is connected to the regular telephone system and receives a regular dial tone. The calling party goes through the normal call process. Responsive to his dialing, he or she is given a call duration announcement indicating the length of call time his credit amount will allow. The time change rate of the call this information is continuously computed and subtracted from the credit amount. The call can be terminated either due to lack of credit or by the user. If the user terminates by dialing special code for example or by closing the hook switch when there is still more credit left, the user is then provided with a regular dial tone. If there is no credit left then the calling party phone is connected to the computer and receives the computer dial tone. If he or she does not dial in his code number after a predetermined time period he or she is disconnected. Using an announcement, he or she can be notified to input a code or be disconnected. It should be understood that both announcements and visual indications can be used.

When the code number and credit of a user are verified, the calling party is then connected through a register to a redialer. The register stores the called number received from the calling party and directs the redialer to dial the number after verification, the dialed number or dial tones are directed through router to the regular telephone system. The router selects the best possible route cost-wise for the particular call if it is a toll call.

The dedicated telephone operates in much the same way as the private phone. The difference is in the special computer control used to time the dedicated public telephone.

The calling customer has the ability to disconnect from the called party but stay connected to the special exchange by dialing a special number. This caller can switch to another code number during the call, before the call and after the call and still remain connected to the special central office.

With the dedicated telephone, when the calling party replaces the hand set, the hook switch a short delay (for example ten seconds) take place, an announcement is made to the calling party notifying the calling party that he or she may call another party without calling the computer again within the allocated time delay.

It is known to use special codes, such as 999, to terminate a call. The calling party can then get another call without having to redial the special exchange and his code. Another special code such as 888, can be used to input more credit with another code number.

In order to maintain security on the aforementioned system when the calling party's credit is being checked, it is necessary that the call position in the memory of the controller be supplied with a disenabling code to prevent the simultaneous operation of the two different telephones using the same code. In addition, the codes each have a home memory which other special exchanges can check. This is an appropriate security safeguard for a single card (with its own authorization number) issued to a single individual. The use of only one call (or purchasing operation) at a time for a single card number presupposes that all credit operations are tied to that single card having the single authorization number. Thus, it is the card number rather than a credit authorization number associated with an individual that determines authorization for credit purchases.

There may be other circumstances in which an individual has established credit, either with a telephone company or a credit authorization network, and wishes to allow a number of simultaneous credit purchases to take place (for example, those conducted by other persons having been made privy to the individual's credit authorization). This sort of flexibility is not accommodated in the aforementioned conventional credit arrangements.

Another drawback of conventional telephone credit purchasing systems is that the purchased long distance telephone call is carried out over a predetermined route selected by the operator of the telephone credit operation. The end user has no input regarding which long distance carriers or which routes will be used to carry out the long distance call. Thus, an individual user who has made special arrangements with a particular long distance interexchange carrier is unable to take advantage of such an arrangement when using the conventional telephone credit purchasing arrangements.

It is also noted that conventional telephone credit purchasing arrangements are directed only to the purchase of long distance telephone calls. There is no accommodation for an individual wishing to make a credit purchase over the telephone of other goods or services, even telephone services other than a pre-selected long distance call. Thus, a individual purchaser of conventional art telephone credit cards finds that he or she must go through a separate authorization routine (with its own Personal Identification Number (PIN)) or authorization number. This can be burdensome to the individual user since the additional authorization routine constitutes efforts that must be made in addition to those required for other credit purchases by the end user.

Another drawback of conventional telephone credit systems is that an elaborate credit card is generated for each user. Of necessity, the generation and distribution of conventional telephone cash cards must be severely constrained in order to keep cards from falling into the hands of wrongful users. Thus, a user may have difficulty obtaining the card, refreshing it and carrying out the necessary authorization procedure.

These drawbacks are addressed by the system, with its various embodiments, of the present invention described below.

DISCLOSURE OF THE INVENTION

1. Objects

One object of the present invention is enablement of quick convenient prepayment of telephone calls.

Another object of the present invention is to provide users of a prepaid cash card with a choice of inter-exchange carriers.

A further object of the present invention is to provide a plurality of different types and levels of authentication for ordering and paying for a variety of telephone calling services.

Still another object of the present invention is to provide quick and easy access to the purchase of goods and services via telephone.

Yet an additional object of the present invention is to provide a method of authenticating purchases made over a telephone system.

2. Summary

These and other objects of the present invention are accomplished using a method of purchasing via telephone connection. The method includes the steps of generating a prepaid cash card having identification data as well as a monetary value based upon cash paid by an end user of the card. As part of the generation process, an agent selling the card selects an interexchange carrier for use with the prepaid cash card for long distance calling. For the user to make purchases, registration is carried out using ID data from the card via telephone connection to an authorization platform. If the user is making a long distance telephone call, the user is permitted to select a second interexchange carrier and to carry out any purchases, such as that of a long distance phone call, via the telephone connection established with the authorization platform.

The aforementioned method operates on a system arranged for carrying out purchases via the telephone connection. The system includes means for generating a prepaid cash card with ID data, as well as means for assigning a prepaid monetary amount to that card. Other means exist for allowing the agent to select an interexchange carrier as well as allowing the end user of the card to select another interexchange carrier. This is done using an authorization platform accessible by a user of the card over a telephone line so that a purchase via the telephone connection can be carried out using the authorization platform.

BEST MODE FOR CARRYING OUT THE INVENTION

Like the conventional art, the present invention is based upon a prepaid cash card that provides an alternative to using coins or other forms of payment for toll calls. As will be described, infra, the purchaser (end user) of the prepaid cash card will have the option of selecting his or her own Interexchange Carrier (IXC) if long distance calls are purchased with the card of the present invention.

Figure 1:
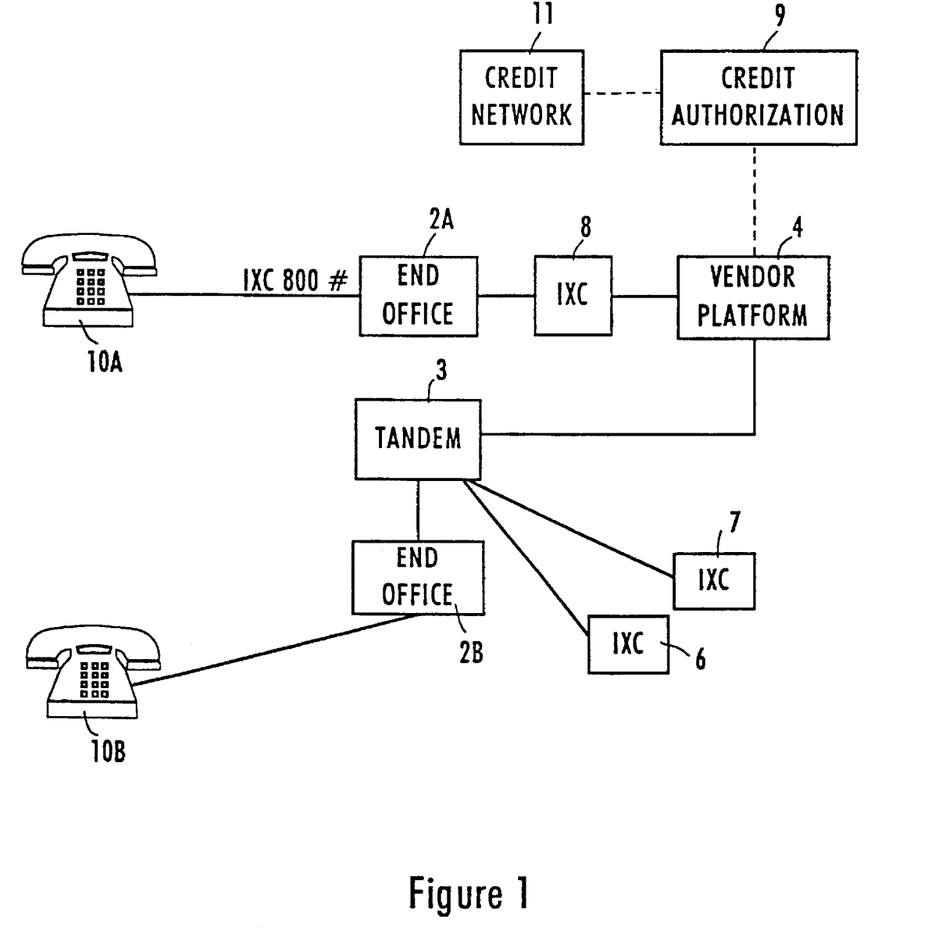
FIG. 1 is a block diagram depicting a telephone system with modifications necessary for supporting the present invention.

After purchase of a prepaid cash card, which has a set dollar value determined at the time of the purchase, the end-user can access services over the Cash Card Network (CCN) such as that described with respect to the conventional art. When an end-user uses the prepaid cash card to place calls, the intelligence to permit call completion will exist within a separate platform (such as vendor platform 4 in FIG. 1) rather than in the calling station. The account management and call rating for the call will be provided through a separate authorization network which can be integrated into an Advanced Intelligent Network (AIN) technology in the ultimate version. However, initially the prototype version will not rely on AIN, but rather a dedicated network as depicted in FIG. 1.

The subject prepaid cash card would provide the competitive advantage of offering access to multiple carriers to its end-users. All of the necessary authorization functions can be handled within a single telephone system LATA (intra-LATA) in accordance with the arrangement depicted in FIG. 1. This is done by the use of a vendor platform 4 which functions as an authorization platform and a Rater such as those previously described. However, the vendor platform is not limited to the previously described prepaid cash card systems. The vendor platform is also used by both the selling agent and the end user to select Interexchange Carriers (IXC) (such as carriers 6 and 7) so that an end user wishing to make a telephone call using the prepaid cash card of the present invention will have the option of selecting the optimum route based upon his or her situation.

An end user making a call from station 10A and 10B will dial an 800 number to access the prepaid cash card system (at the vendor platform 4). Like all outgoing calls, the 800 number dialed by the user at 10A is processed by a standard telephone company central office switch 2A. An example of such switches would be constituted by an SS7 configured for use in an AIN. An SSP-capable central office switching systems typically consist of a programmable digital switch with CCIS communications capabilities. One example of an SSP capable CO switch is a 5ESS type switch manufactured by AT&T; but other vendors, such as Northern Telecom and Seimens, manufacture comparable digital switches which could serve as the SSP's.

The embodiment using an AIN is perhaps an ideal implementation of the present invention which would make a variety of AIN services widely available at the local office level throughout the network. Other AIN implementations provide the SSP functionality only at selected points in the network. End offices without such functionality forward calls to one of the SSP's. However, in this embodiment of the present invention, the AIN is not necessary. Consequently, the end office switch 2A can be constituted by considerably less complex or less elaborately programmed devices than the well known SS7 switch. Upon identifying the 800 number, the switch routes the call to the proper inter-exchange carrier (IXC) 5. The call is then delivered to vendor platform 4 in accordance with the 800 number dialed by the user. Afterwards, the additional functions of the present invention can be carried out as described infra.

Figure 2:
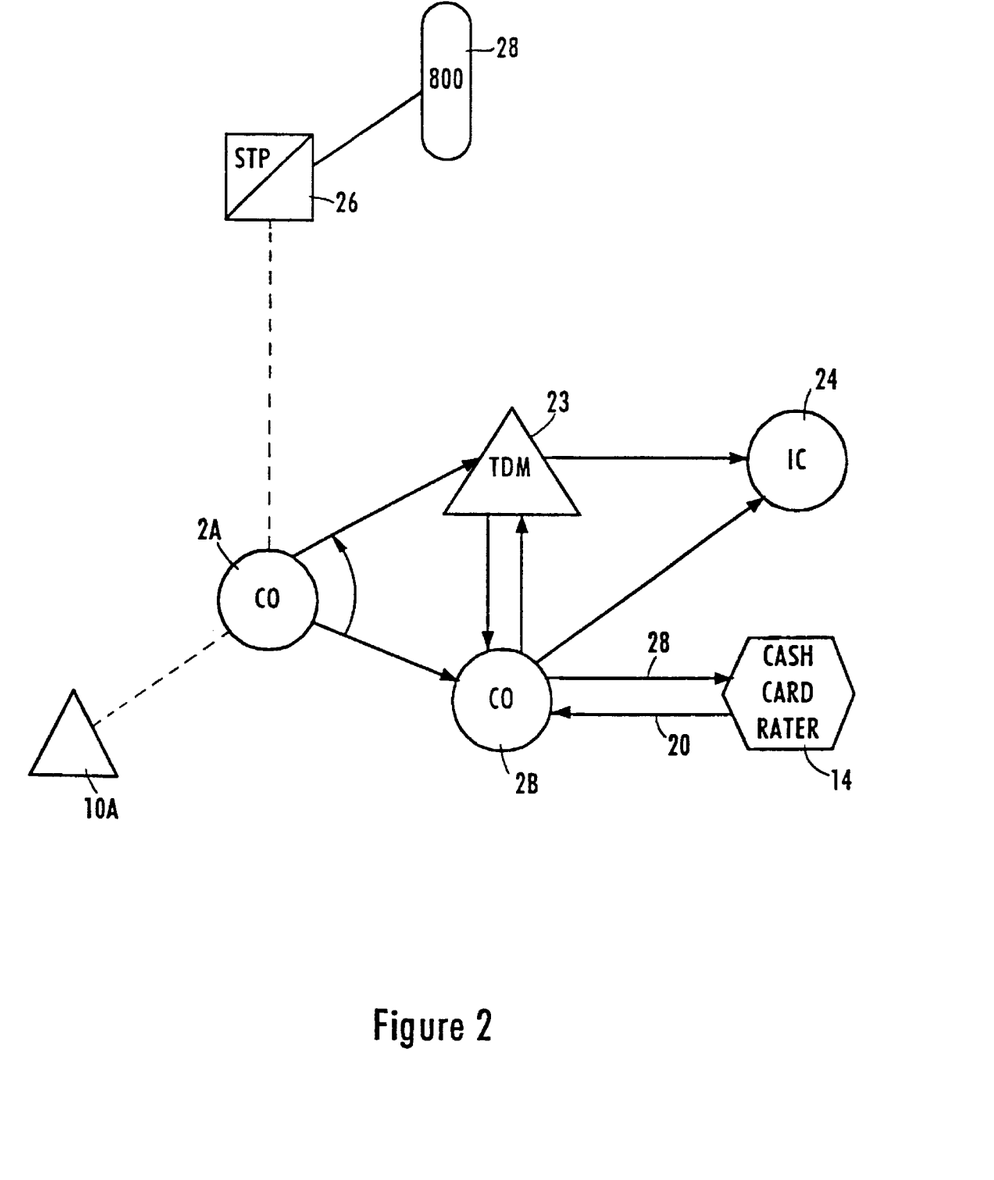
FIG. 2 is a block diagram depicting a variation of the system of the present invention directed to an Advanced Intelligent Network.

The second implementation of the present invention is illustrated in block diagram form in FIG. 2. According to this implementation, an end-user may use any telephone station 10 to place a call to the telephone network via the end office 2A connected to the telephone 10. This implementation is arranged to utilize the advantages presented by certain portions of AIN, such as Signaling Transfer Point (STP) 26. With the exception of the connection to the AIN elements, the arrangement of FIG. 2 is very much like that described with respect to the conventional art. The implementation of FIG. 1 can also be used where a connection between end office switch 2A would be made to STP 26 and then to 800 data base 28. For purposes of describing the present invention, the implementation of FIG. 2 could stand alone without the connection to the AIN elements since the functions carried out in the FIG. 1 implementation can also be carried out in the FIG. 2 implementation without the AIN elements. However, it is noted that the presence of the AIN elements make implementation of the present invention much easier to carry out.

Deployed in the network is a Cash Card Rater (Rater) 14, which is used in the manner of a PBX associated with an end office 2B. The Rater may be connected to its end office via Direct-in-Dial (DID) lines 18 and Direct-out-Dial (DOD) lines 20. The end office 2B may also be connected to a tandem switch (TDM) 3 and to an interexchange carrier (IXC) 24. The initiating end office 2A is connected to the STP 26 which is in turn connected to the 800 database 28. The sequence of a typical prepaid cash card call may be as follows:

The end-user at telephone station 10, which may or may not be a toll station, dials an access number which could be a 10-digit number but which is initially being considered as an 1-800-access number. The dialing of this number would go to the 800 database 28 where it would be translated to a POTS number and sent to the appropriate central office which has been assigned the NNX for 800. In this illustration the 800 database translates the 800 number to a POTS number which is sent to the end office 2B serving the Rater 14. The end office 2B sends the call to the Cash Card Rarer 14. The Rater queries the caller and proceeds through a suitable voice menu selection process where the caller inputs his account number and the number which the caller desires to call.

The Rater 14, via the voice menu, obtains from the caller the customer account number and the number the customer or user desires to call. The customer account number, which may be printed on the caller's prepaid cash card, is received by the Rater and matched with a database of account numbers maintained in a memory at the Rater. The proposed called number is also received by the Rater and the toll for service from the calling end office 2A to the called number is computed in the Rater.

This toll is then checked against the status of the account of the identified calling customer to determine whether or not the account contains sufficient funds to process the call. The Rater 14 then initiates a message back to the caller indicating the amount of cash in the account and the corresponding number of minutes of call which would be permitted for the requested call. The Rater then dials out the requested call back through the CO 516 which services the Rater. The call is thereafter handled in routine fashion with least cost routing performed in the conventional manner by the network commencing with CO 2B. The calls stays up through the Rater for the entire duration of the prepaid cash card call. The Rater originates the call and then does a conference bridge to CO 2A and the calling telephone station 10A. The Rater monitors and times the call and will not allow the call to exceed the amount on deposit in the caller's account. The Rater will give the caller a one minute prompt notice and then terminate the call at the expiration of that minute.

Figure 3:
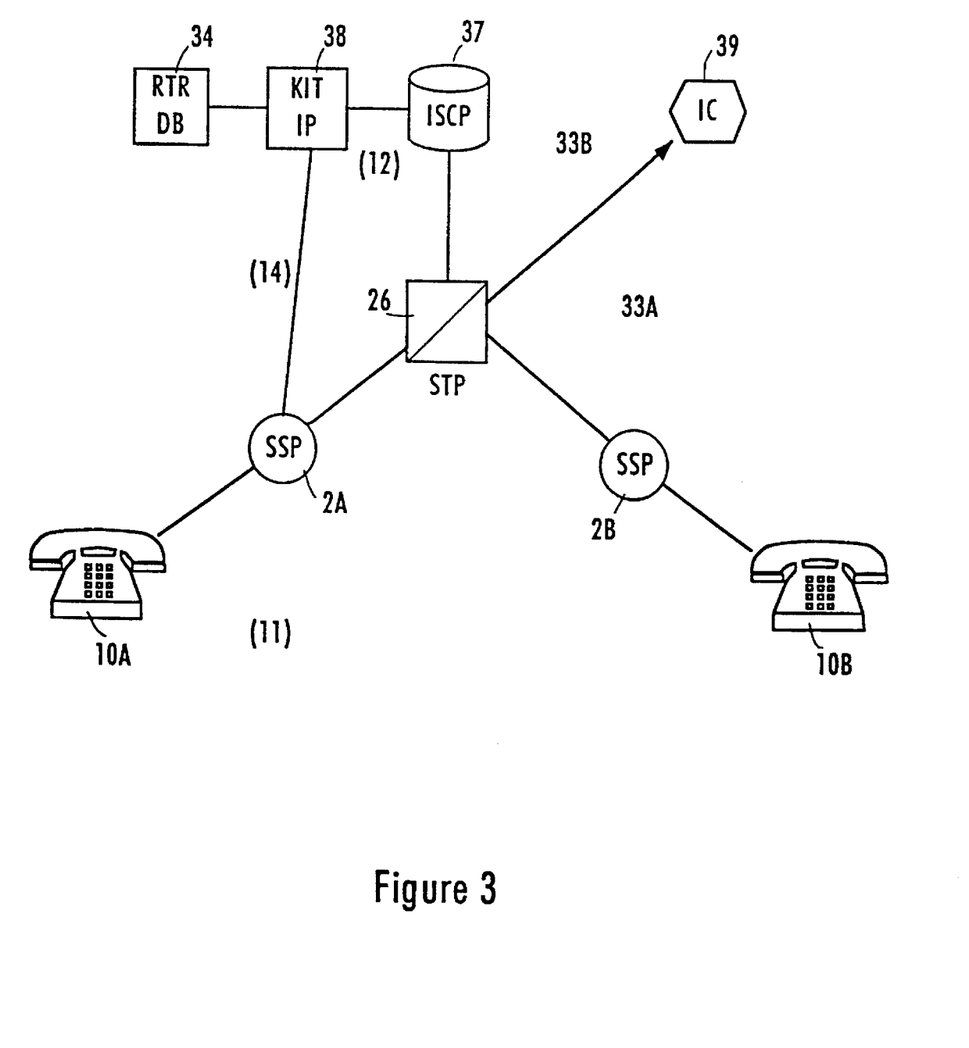
FIG. 3 is a block diagram depicting a variation of the present invention employing an Intelligent Peripheral (IP).

A more comprehensive AIN implementation is illustrated in FIG. 3. Referring to that figure, prepaid cash card selection from station 10 through SSP/CO 2A will initiate through STP 16 a TCAP message to ISCP 37 or to an IP interface 38. This TCAP message (trigger) will cause the ISCP to direct the switch 2A which is associated with the Rater 34 to play an announcement requesting the end user to enter their account number and the number of the called party.

The ISCP will validate the account number and direct the switch 2A to play an announcement providing current account balance and call time for the call just placed. At this point the ISCP will direct the switch 2A to add on the Rater 34 as a resource while simultaneously downloading the account information to the Rater. The Rater will then monitor the call and decrement the account balance. If the account balance is exhausted during the call, the Rater will play a one minute warning announcement and then terminate the call at the expiration of the minute. Upon call termination, the Rater 34 will upload the current account balance to the ISCP.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node.

There could be one or more ISCP's per regional coverage area, to avoid overloading existing CCIS data links. Alternatively, the ISCP could be implemented on a LATA by LATA basis or on a regional operating company basis, i.e. one database for the entire geographic area serviced by one of the Regional Bell Operating Companies. In fact, if Federal regulations permitted, the database service could become nationwide.

Based upon known usage in the conventional art, it is probable that the most popular purchase made by prepaid cash cards is for long distance telephone calls. As indicated in the explanation of the conventional art, the routing for such calls is preselected, probably by the telephone carrier issuing the cards. With this arrangement, the inter-exchange carriers (IXC) are selected by the local telephone carrier based upon circumstances that are most favorable to that telephone carrier.

However, the particular IXC selected may not be most favorable for the conditions in effect for the location at which the prepaid cash card is issued to a user. In order to optimize advantages based upon the location at which the prepaid cash card is issued, the issuing agent has the option of picking the most advantageous IXCs for making long distance phone calls from the region in which the prepaid cash card issued. In order for the issuing agent to select the IXC for long distance calls from the agent's region, the agent can go through the same process previously described with respect to making long distance telephone calls. Under, such circumstances, the issuing agent would be provided with a special identification number and preferably an additional group code number to assure security. The issuing agent could log on with the vendor platform 4 in order to make the selection of preferred IXCs in the same manner as a purchaser would log on to the vendor platform in order to make long distance telephone calls.

An additional advantage of the present invention is that the purchaser of the prepaid cash card would have the option of selecting his or her own IXCs when logging onto the vendor platform for purposes of making a long distance telephone call. The vendor platform could be provided with messaging functions to advise the user of the default IXC, as well as providing instructions for selecting an IXC of choice. These messaging functions could be contained as part of the vendor platform or could be provided as part of an IP (not shown). In this selection process, it is necessary that the purchaser provide any identification number from the prepaid cash card, any group code or PIN in order to maintain the integrity of the system. The same procedure would have to be followed by the issuing agent. This is particularly important since while selecting the long distance IXCs, the issuing agent could also be determining the credit value of any cards that issue. It is also necessary to maintain security that since the agent when assigning the credit value to a card to be sold will also be using the identification or code number of that card.

The identification number or code number associated with a prepaid cash card is also particularly important since this number can be used by the ultimate user/purchaser to obtain more than long distance calling service. Referring to FIG. 1, the vendor platform can connect a user/purchaser at station 10A to a credit authorization system 9 at which the user's credit worthiness could be evaluated for telephone purchases made over credit network 11.

Such networks are well known in the conventional art and examples exist to facilitate the purchase of goods via telephone using a credit card. Credit network 11 merely represents the consolidation of any number of such networks currently in use. Thus, it is possible to establish credit authorization based upon the purchaser's identification or code number from the prepaid cash card. This could be done in the same manner as is done for any credit card. In the initial authorization process, a credit card could be used, or a bank account could be used as indication of credit worthiness. A credit line could be established against an existing bank account, against existing credit card accounts, or a new account could be opened on behalf of the purchaser and maintained by either the local telephone carrier or the selling agent providing the card to the purchaser.

Once credit worthiness of the purchaser or user has been established, multiple application capability can be instituted. For example, any restaurant or other vendor that does business over the telephone using established credit accounts can be accessed by the user to make purchasers. Further, other services may be available to the user via established credit lines accessed through the prepaid cash card number of the present invention. Such services could require payment from the line of credit or existing accounts or could be provided gratis as part of the service available to users of the prepaid cash card. Examples include provision of stock information, sports scores, music, advertising, etc. Such services would be provided from vendor platforms (such as 4 in FIG. 1) that can be interfaced with a credit authorization system or credit network. The available services could be reviewed using a special menu accessed through a 1-800 number. The menu could be provided by a vendor platform connected to a serving SSP or accessed via an ISCP (such as 34 in FIG. 3).

Since, under such circumstances, security of the authorization number used by the purchase would be particularly critical, special steps would have to be taken to maintain such security. The first step would be the protection of the identification number on the prepaid cash card. However, since such numbers are normally printed on the card, loss of the card would compromise any security, and if a line of credit had been opened based upon the card number, purchaser's funds could be jeopardized by a wrongful user who had somehow acquired the card. A second level of security would be an additional group number or group code to be provided by the issuing agent. Such a code could be provided on a separate piece of hard copy so that a wrongful user would have more difficulty obtaining all the necessary authorization data to access the purchaser's credit account. An additional level of security can be provided by a selection of a secret Personal Identification Number (PIN) by the purchaser. This would be generated by the purchaser and entered the first time that the purchaser establishes authorization to make a purchase using the prepaid cash card. Such a number would have to be memorized by the purchaser or kept on a separate hard copy accessible only to the purchaser. Unfortunately, for convenience, there would be a tendency by purchasers to put all three numbers on the same hard copy so that a wrongful user finding the card would have no difficulty accessing the purchaser's line of credit.

One solution to the aforementioned problem would be the use of voice recognition as an authorization mechanism. When the purchaser would first call in to establish authorization with the vendor platform, a voice recognition sequence could be run so that in the future, authorization numbers would not be necessary. Rather, the system would merely carry out voice recognition to allow a purchaser to have access to the line of credit to make purchases over the telephone.

The voice recognition system could be part of an IP attached to the vendor platform of FIG. 1. If the system of FIG. 2 is used, the voice recognition system could be part of an IP attached to the cash card Rater 14. On the other hand, the voice recognition system could be part of the 800 data base 28. Art additional alternative is found in FIG. 3 where the IP supporting voice recognition could be contained within KIT IP 38. An additional IP could also be attached to either data base 34 or IP 38. The use of a voice recognition IP for authorization purposes is preferable to obtain the optimum use of the subject system in which a purchase would not be limited to a hard copy of the prepaid cash card, or the dollar amount originally assigned to that card. Rather, the purchaser could initially establish a line of credit to be refreshed from other existing lines of credit or sources of funds.

Any of the embodiments of FIGS. 1–3 would support a connection to a credit authorization system and a credit network thereby allowing purchaser to use the original authorization whether by voice recognition or secret code numbers to carry out virtually any purchasing operation supportable by the purchaser's financial resources via telephone. Those skilled in the art of telephone network configuration would have no difficulty accessing a credit authorization system and credit network via either the arrangements of FIG. 2 or FIG. 3.

For the FIG. 2 embodiment, access to the credit authorization system could be via tandem switch 3, an additional SS7 switch (not shown) or via a connection to 800 data base 28. In the FIG. 3 embodiment, the most likely configuration would include a connection from ISCP 37 to another ISCP (not shown) serving a credit authorization system and credit network. However, the key to this expanded operation is the use of a voice recognition system, preferably contained in an IP associated with the vendor platform 4. It is noted that the vendor platform can access such an IP via a tandem switch 3.

Figure 4:
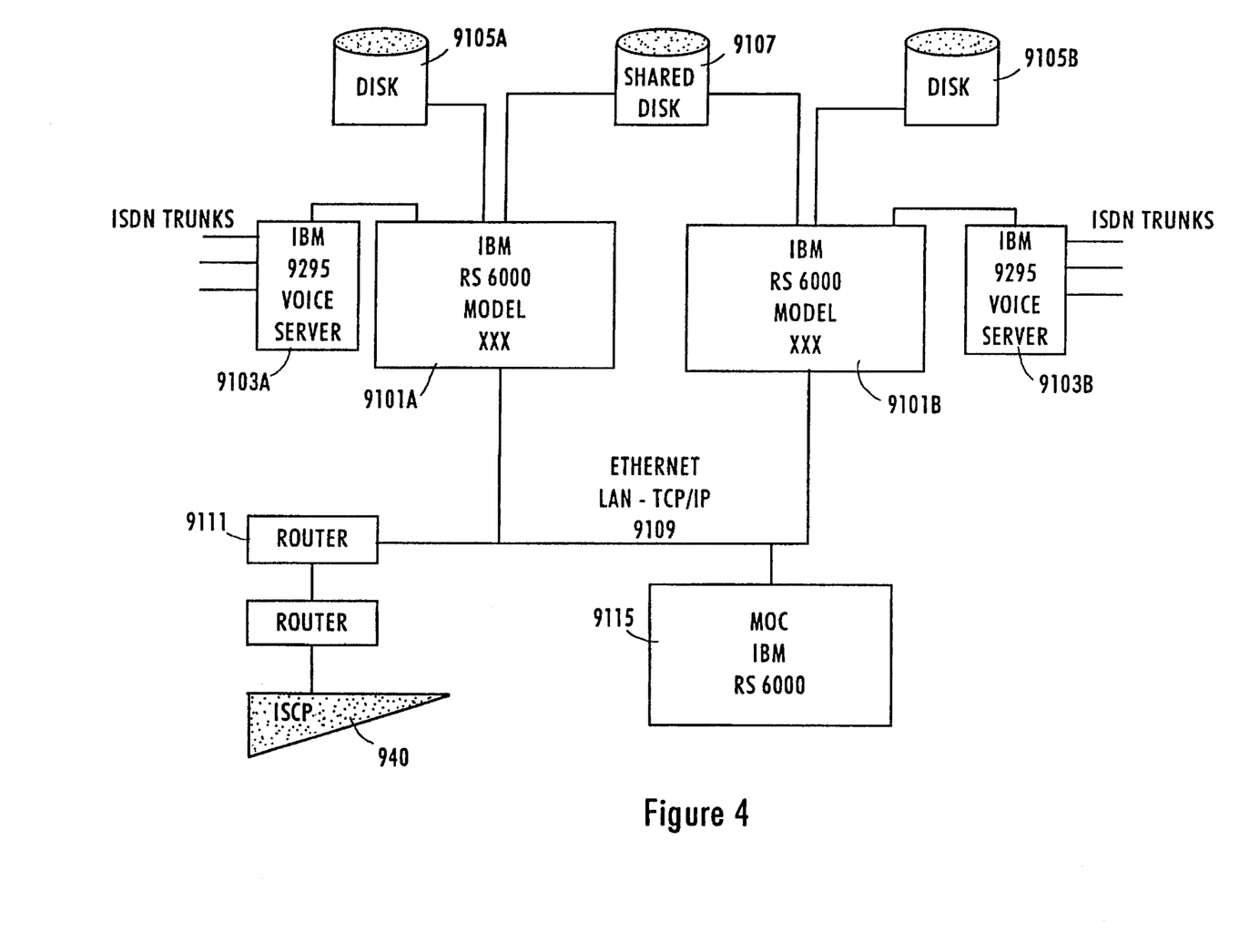
FIG. 4 is a block diagram depicting elements of an IP.

FIG. 4 depicts IP details. In this implementation, the IP will consist of two or more general purpose computers 9101A, 9101B, such as IBM RS-6000's. Each general purpose computer will include a digital voice processing card for sending and receiving speech and other audio frequency signals, such as an IBM D-talk 600. Each voice processing card will connect to a voice server card 9103A or 9103B which provides the actual interface to T1 or primary rate interface ISDN trunks to the SSP type switching office. The plurality of computers may have associated dedicated disk storage 9105A, 9105B, and the IP will included a shared disk memory 9107. Each computer will also include an interface card for providing two-way communications over an internal data communications system, such as Ethernet type local area network 9109. The Ethernet carries communications between the individual computers and between the computers and a router 9111 which provides an interconnection to the second signalling communications network going to the ISCP. The IP may also include another general purpose computer 9115 configured as a terminal subsystem, for use as a maintenance and operations center (MOC) and providing operations personnel access to the IP. The number of processors provided in the IP and the number of voice servers will depend on project service demands. One additional processor and associated voice server will be provided as a backup.

Each general purpose computer 9101A, 9101B will run a node manager, an IP/ISCP Interface program, appropriate voice processing software and a variety of application software modules to offer the proposed services of the IP. The central administrator or "Node Manager" program module, running on each computer, will monitor and control the various IP resources and operations.

The digital voice processing card and associated software will provide speech synthesis, speech recognition capabilities and DTMF tone signal reception, for use in a number of different applications. The speech synthesis and DTMF tone signal reception, for example will replace the announcement and digit collection functions of the SSP switches in various existing AIN services. The general purpose computers and associated circuits will also run a variety of other types of service program modules, for example a voice mail server module and/or a fax mail server module.

Figure 5:
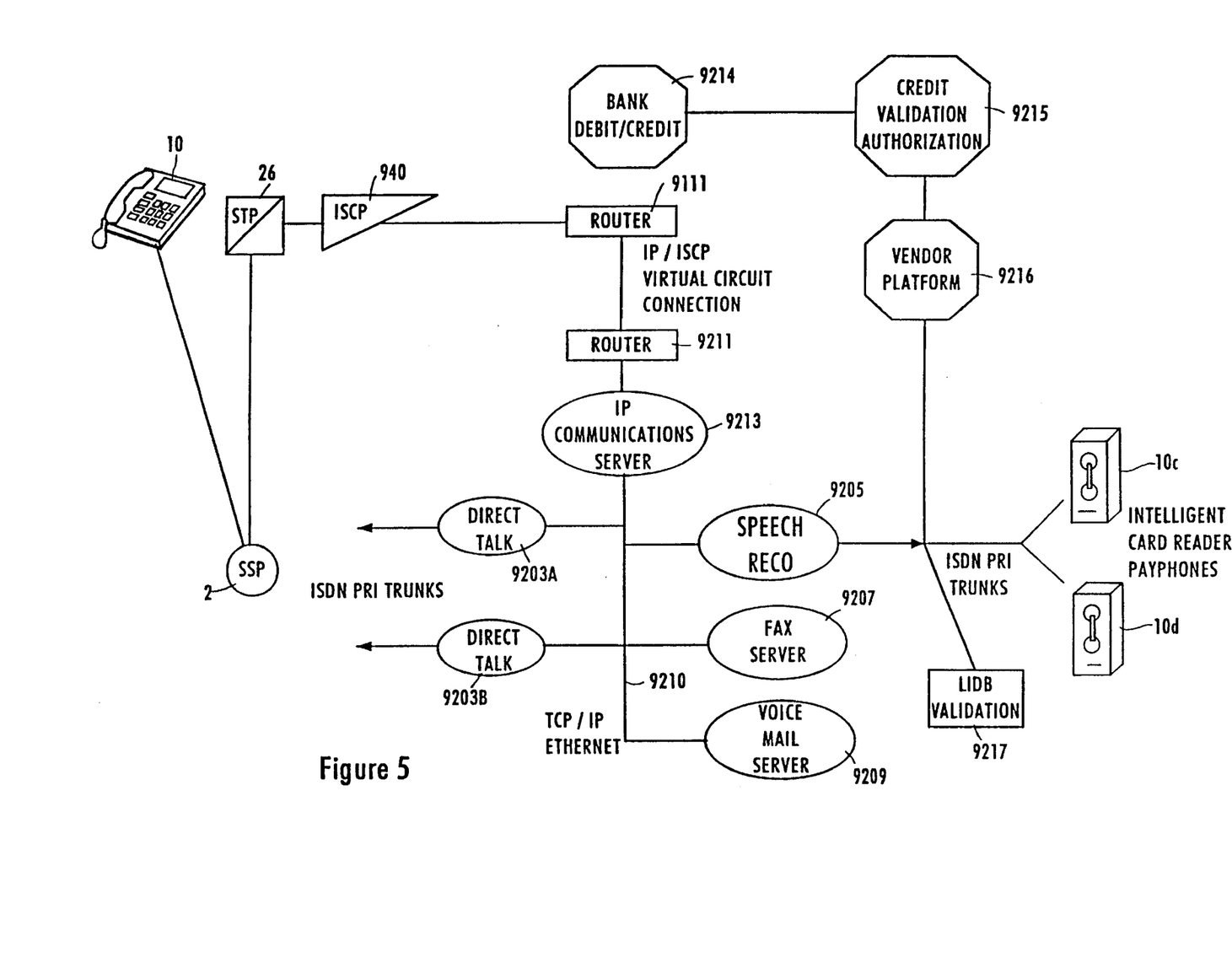
FIG. 5 is a block diagram depicting an expanded system using an ISDN trunk.

FIG. 5 depicts an alternate arrangement of the IP. The alternate architecture utilizes separate modules for different types of services or functions, for example, one or two Direct Talk type voice server modules 9203A, 9203B for interfacing the trunk to the SSP, a separate module 9205 for speech recognition, a server module 9209 for voice mail, and another server 9207 for fax mail services, etc. The various modules communicate with one another via an data communication system 9210, which again may be an Ethernet type local area network.

The Direct Talk modules 9203A, 9203B provide voice message transmission and dialed digit collection capabilities, as in the earlier embodiment. The modules 9203A, 9203B also provide line interfaces for communications to and from those servers which do not incorporate line interfaces. For example, for facsimile mail, the Direct Talk module connected to a call would demodulate incoming data and convert the data to a digital format compatible with the internal data communication network 9210. The data would then be transferred over network 9210 to the fax server 9207. For outgoing facsimile transmission, the server 9207 would transfer the data to one of the Direct Talk modules over the network 9210. The Direct Talk module would reformat and/or modulate the data as appropriate for transmission over the ISDN link to the SSP. The Direct Talk modules provide a similar interface function for the other servers, such as the voice mail server 9209.

The illustrated IP also includes a communication server 9213. The communication server 9213 connects between the data communication system 9210 and the router 9211 which provides communications access to the second signalling communication system and the ISCP 940 and other IP's which connect to that signalling communication system. The communication server 9213 controls communications between the modules within the IP and the second signalling communication system.

In each of the proposed architectures, the SSP switch would route calls to the different elements of the IP in response to instructions from the ISCP. In the initial implementation using general purpose computers (FIG. 4), each of which offers all service functionalities, the decision to route to a particular one of the computers would be a resource availability/allocation decision. If necessary data can be exchanged between the computers via the internal data communications network, e.g. if a message for a particular subscriber's service is stored in the disc memory associated with one computer but the other computer is actually processing the call. In the second implementation (FIG. 5), however, the ISCP would instruct the SSP to route the call for the particular line to the specific module capable of providing a calling customer's individual service. For example, if the subscriber has some form of speech recognition service, the call would be routed to the speech recognition module 9205, If the subscriber has a voice mail service, however, the ISCP would instruct the SSP to route the call to one of the lines going to one of the voice server modules 9203A, 9203B. The module 9203A, or 9203B would receive outgoing voice messages from the voice mail server 9209 for transmission to the caller. The module 9203A or 9203B would decode DTMF signals and supply appropriate data to the voice mail server, for control purposes. The module 9203A or 9203B would also format incoming voice messages for transmission over internal network 9210 and storage by server 9209.

Using a proprietary protocol +1129 developed for this project, the IP will query ISCP in response to a call. Thus, during a call, a trigger event occurs. The SSP queries the ISCP which responds by instructing the SSP to route the call to the IP, using standard TCAP protocol messages. Using the +1129 protocol, when the SSP routes the call to the IP, then the IP queries the ISCP and receives one or a sequence of instructions as to how to process the particular call. The message set defined by this protocol is as follows:

*ProvideInstructions*—message sent by the IP to ask ISCP software for information on handling a call. Begins a transaction and provides necessary information to start the appropriate MSAP script.

*CallInfoToReSource*—sent by ISCP software to the IP to inform it to play messages to the caller and/or collect and return digits entered by the caller. May inform the IP to terminate the call.

*CallInfoFromResource*—message sent by the IP in response to the preceding *CallInfoToResource* message. Includes result code and collected digits.

*SwitchInfoToResource*—message sent by ISCP software to provide the IP with the information it needs to transfer the call elsewhere. This message and the following one are not part of TA-NWT-001129.

*SwitchInfoFromResource*—message sent by the IP or ISCP software with the result of the preceding *SwitchInfoToResource*.

*ResourceClear*—message may be sent by the IP in response to a preceding *CallInfoToResource* if that preceding message requested that the call be terminated. Also, may be sent by the IP asynchronously to alert ISCP software that the call was terminated by the customer. This message includes a parameter describing the "cause" for terminating the call.

*CancelResourceEvent*—message sent asynchronously by ISCP software to terminate the conversation. Implies abnormal termination, Normally *CallInfoToResource* is used to terminate a call.

*ExtendedInfoToResource*—message sent by ISCP software to the IP to provide a standard format for extending the message set above. In this specification, it is used to extend the message set to include the Play Application with information message.

*ExtendedFromToResource*—message sent by the IP to ISCP software in response to the *ExtendedInfoToResource* message above.

A modified protocol specified in Bellcore TA-NWT-001129 includes a similar but somewhat smaller message set which may be used for communications between an ISCP and an SSP as an enhancement over the standard TCAP message set.

As an alternative or in addition to the +1129 protocol, communications between the IP and the ISCP may utilize generic data interface (GDI). The GDI command set is simpler and more generic, and the commands can carry more data. Also, the ISCP can initiate communications using GDI. This permits a wider variety of routing and processing routines. In response to a triggering event, the SSP would again receive instructions to route a call in progress to the IP. However, rather than waiting for a subsequent query from the IP, while the SSP is routing the call the ISCP could instruct the IP to prepare to receive a call on a particular circuit. For example, for a call which might require speech recognition processing, the ISCP would instruct the IP to retrieve appropriate recognition templates from memory. Other protocols could be used to permit either the ISCP or the IP to initiate communications.

Speech recognition module 9205 (in FIG. 5) can be accessed by other users, such as those at intelligent card reader pay phones 10C and 10D. These pay phones are connected to ISDN primary trunks in order to take advantage of the benefits of the present invention. As previously described a vendor platform such as 9216 can be accessed to make purchases by the users on the basis of existing credit accounts accessed via the number of the prepaid cash card of the present invention. The credit validation authorization platform 9215 generally works with a bank or debit/credit network 9214 as previously described. An alternative is LIDB validation platform 9217 which has the capability of acting as a rater for the prepaid cash card of the present invention, and carrying out the authorization functions with respect to making long distance telephone calls and selecting interexchange carriers.

The intelligent card reader pay phones 10c and 10d would have the capability of reading either a standard credit card or a smart/cash card, or even a copy of the prepaid cash card. However, the prepaid cash card of the present invention depends upon retaining the secrecy of the number provided on issuance of the card so that reading the card is not necessary, and even may be considered undesirable. Nonetheless, it is important that as many options be provided for the user as possible in order to make the system as "user-friendly" as possible. The pay phone would of course continue to accept coins and handle standard 1-800 calling functions. A single ISDN line with a two-voice capability would be able to serve two public pay phones. In such an arrangement a single ISD line would interface with all of the AIN network, LIDB validation platform, credit card network, voice recognition platform, voice mail server, etc. Thus the maximum flexibility would be provided to the user of the network. Of course, the greatest facility would be provided through the use of the prepaid cash card of the present invention, rendering easy access to all of the services associated with an advanced intelligent network.

Although a number of arrangements of the present invention have been mentioned by way of example, it is not intended that the invention be limited thereto. For example, the present invention can be adapted by appropriate use to include any functionality possible with the IP previously described. There is no need to limit the functionality of the IP to voice recognition. Rather, access to electronic mail or other services can be facilitated by the arrangement of the present invention. Accordingly, this invention should be considered to include any and all configurations, modifications, variations, combinations or equivalent arrangements following within the scope of the following claims.

We claim:

1. A method of purchasing services via a telephone connection, comprising the steps of:

(a) generating, by a sales agent, a prepaid cash card which includes a unique data set for identification (ID) purposes;

(b) selecting an interexchange carrier for use with said prepaid cash card by an agent selling said prepaid cash card;

(c) purchasing said prepaid cash card from said agent by said user and assigning a monetary value to said prepaid cash card;

(d) registering said ID data set via a telephone connection to an authorization platform;

(e) selecting a second interexchange carrier by said user in use of said card; and (f) following said registration of said ID data set by using said card in carrying out a purchase via a telephone connection to a vendor.

2. The method of claim 1, wherein said step (d) further comprises storing said monetary value in said authorization platform.

3. The method of claim 2, wherein said step (f) further comprises verifying said ID data set at an authorization exchange.

4. The method of claim 3, wherein said step of verifying said ID data set comprises verification by a credit purchasing system.

5. The method of claim 3, wherein said step (f) further comprises the step of comparing said monetary value to a monetary value corresponding to the value, of the desired purchase.

6. The method of claim 1, wherein said prepaid cash card is authorized for sale by said agent based upon a transfer of funds between said agent and a telephone service provider.

7. The method of claim 6, wherein said purchase comprises services provided by said second interexchange carrier selected by said agent.

8. The method of claim 6, wherein said purchase comprises services provided by said second interexchange carrier selected by said user.

9. The method of claim 1, wherein step (d) is carried out by establishing a telephone connection between a telephone company central office switch and said authorization platform using a 1-800 telephone line.

10. The method of claim 1, wherein said authorization platform comprises an Intelligent Peripheral (IP) associated with a telephone company central office switch servicing said user.

11. The method of claim 1, wherein said authorization platform comprises an Intelligent Peripheral (IP) associated with a tandem switch connected to a telephone company central office switch servicing said user.

12. The method of claim 1, wherein said ID data set comprises a Personal Identification Number (PIN) generated with said prepaid cash card.

13. The method of claim 12, wherein said ID data set further comprises a group code provided by a telephone service provider.

14. The method of claim 13, wherein said ID data set further comprises a second PIN provided by said user.

15. The method of claim 12, wherein said ID data set further comprises voice ID data generated at said authorization platform during said step (d).

16. The method of claim 10, wherein said IP is connected to an Integrated Services Control Point (ISCP), and a said ISCP facilitates transactions between said IP and a credit purchasing network.

17. The method of claim 8, wherein said services provided by said second interexchange carrier comprise carrying out a long distance phone call.

18. The method of claim 17, wherein said authorization platform is programmed to carry out said long distance phone call on a least cost basis.

19. The method of claim 17, wherein said user selects routing for said long distance phone call.

20. The method of claim 1, further comprising the step of:

(g) adding additional monetary value to said prepaid cash card by carrying out a telephone connection from said user to said authorization platform.

21. The method of claim 20, wherein said additional monetary value is authorized via a connection between said authorization platform and a credit purchasing system.

22. The method of claim 21, wherein said connection between said authorization platform and said credit purchasing system is carried out by using standard telephone voice channels.

23. The method of claim 21, wherein said connection between said authorization platform and said credit purchasing system is carried out over common channel interoffice signaling channels, and is controlled by an (ISCP).

24. The method of claim 20, further comprising the step of:

(h) storing rate information for a plurality of interexchange carriers in said authorization platform, and periodically updating said rates.

25. The method of claim 24, wherein said rates are updated via a standard telephone voice channel connection between said authorization platform and an external data base.

26. The method of claim 24, wherein said update is carried out over common channel interoffice signaling lines controlled by an ISCP.

27. The method of claim 8, wherein said services provided by said second interexchange carrier comprise a voice mail operated at said authorization platform and accessible by said user.

28. The method of claim 8, wherein said services provided by said second interexchange carrier comprise a voice mail operated from a second IP associated with said authorization platform and accessible by said user.

29. The method of claim 21, wherein said authorization platform is constituted by a telephone company tandem switch connected via voice lines to a plurality of telephone company central office switches.

30. The method of claim 1, wherein said generation of said prepaid cash card is carried out by operating at premises of said agent.

31. The method of claim 4, wherein said ID data set consists of voice recognition data.

32. The method of claim 31, wherein said voice recognition data comprises user credit data in said credit purchasing system.

33. The method of claim 1, wherein step (f) further comprises using said second interexchange carrier selected by said user.

34. A system arranged for carrying out purchases via a telephone connection, comprising:

(a) means for generating a prepaid cash card which includes a unique data set for identification (ID) purposes;

(b) means for selecting an interexchange carrier for use with said prepaid cash card when generating said prepaid cash card;

(c) an authorization platform accessible via telephone by a user of said prepaid cash card;

(d) means for selecting a second interexchange carrier by said user in use of said card; and (e) means for a user carrying out a purchase by establishing a telephone connection from said user to said authorization platform to establish identity using said ID data set.

35. The system of claim 34, wherein said authorization platform comprises means for storing a monetary value associated with said prepaid cash card.

36. The system of claim 35, wherein said authorization platform further comprises means for verifying said ID data set of said prepaid cash card.

37. The system of claim 36, wherein said authorization platform further comprises means for exchanging data with external data systems.

38. The system of claim 37, wherein said external data system comprises a credit purchasing system.

39. The system of claim 35, wherein said authorization platform further comprises means for comparing a monetary value assigned to said prepaid cash card in comparison to a monetary value corresponding to said purchase.

40. The system of claim 39, wherein said authorization platform further comprises a rating platform connected to said authorization platform and arranged to monitor said first monetary value.

41. The system of claim 40, wherein said authorization platform further comprises means for determining at least cost routing of a long distance phone call based upon stored rates for interexchange carriers.

42. The system of claim 42, further comprising:
(f) means for updating said rates in said authorization platform.

43. The system of claim 42, wherein said authorization platform comprises an Intelligent Peripheral (IP) associated with a telephone company central office switch servicing said user.

44. The system of claim 42, wherein said authorization platform comprises a tandem switch connected to a telephone company central office, switch servicing said user.

45. The system of claim 42, wherein said authorization platform comprises a tandem switch connected to a telephone company central office switch servicing said user.

46. The system of claim 34, wherein said ID data comprises a Personal Identification Number (PIN) generated when said prepaid cash card is generated.

47. The system of claim 46, wherein said ID data further comprises a group code provided by a telephone service provider.

48. The system of claim 47, wherein said ID data further comprises a second PIN provided by said user.

49. The system of claim 48, wherein said ID data further comprises voice ID data generated by said authorization platform.

* * * * *